United States Patent
De Vries

(10) Patent No.: US 9,340,355 B2
(45) Date of Patent: May 17, 2016

(54) STORAGE AND/OR ORDER COLLECTION SYSTEM

(75) Inventor: Hugo Victor De Vries, CH Almere (NL)

(73) Assignee: I-COLLECTOR HOLDING B.V., Almere (NL)

(*) Notice: Subject to any disclaimer, the term of this patent is extended or adjusted under 35 U.S.C. 154(b) by 0 days.

(21) Appl. No.: 14/008,625

(22) PCT Filed: Mar. 29, 2012

(86) PCT No.: PCT/NL2012/000025
§ 371 (c)(1),
(2), (4) Date: Sep. 30, 2013

(87) PCT Pub. No.: WO2012/134269
PCT Pub. Date: Oct. 4, 2012

(65) Prior Publication Data
US 2014/0044506 A1 Feb. 13, 2014

(30) Foreign Application Priority Data
Mar. 30, 2011 (NL) .................................. 1038714

(51) Int. Cl.
*B65G 1/00* (2006.01)
*B65G 1/04* (2006.01)
*B65G 1/06* (2006.01)

(52) U.S. Cl.
CPC ............... *B65G 1/0435* (2013.01); *B65G 1/06* (2013.01)

(58) Field of Classification Search
CPC ...... B65G 1/0435; B65G 1/06; B65G 1/0485; B65G 1/10
See application file for complete search history.

(56) References Cited

U.S. PATENT DOCUMENTS

| | | | | |
|---|---|---|---|---|
| 3,240,365 A | * | 3/1966 | King | 414/273 |
| 5,328,316 A | * | 7/1994 | Hoffmann | 414/280 |
| 5,927,926 A | * | 7/1999 | Yagi et al. | 414/280 |

(Continued)

FOREIGN PATENT DOCUMENTS

| | | |
|---|---|---|
| FR | 2 915977 | 11/2008 |
| GB | 1 389 221 | 4/1975 |

(Continued)

OTHER PUBLICATIONS

International Search Report dated Jun. 28, 2012; corresponding to PCT/NL2012/000025.

*Primary Examiner* — Saul Rodriguez
*Assistant Examiner* — Mark Hageman
(74) *Attorney, Agent, or Firm* — Young & Thompson

(57) ABSTRACT

Storage device for storing and/or retrieving articles from storage, includes a frame having a first series of mutually parallel elongated storage sections, preferably positioned in a column set-up, that extend between a first end and a second end of the frame; a number of holders for the articles; storage sections being provided with holder supports, wherein at the first and second ends of the frame, first and second platforms, respectively, have been arranged for accommodating at least one holder; and first movement elements for moving the platforms, from one storage section to another; second movement elements for horizontally moving at least one holder from the first platform at the first end of the frame to the holder supports of a selected storage section while moving one or more holders from the selected storage section to the second platform at the second end of the frame, and vice versa.

22 Claims, 11 Drawing Sheets

(56) References Cited

U.S. PATENT DOCUMENTS 8,636,459 B2 * 1/2014 Neeper .................. 414/280
2010/0098517 A1 * 4/2010 Hishiya ................. 414/160

FOREIGN PATENT DOCUMENTS

| JP | 442104 | 4/1992 |
|---|---|---|
| WO | 2010/090512 | 8/2010 |

* cited by examiner

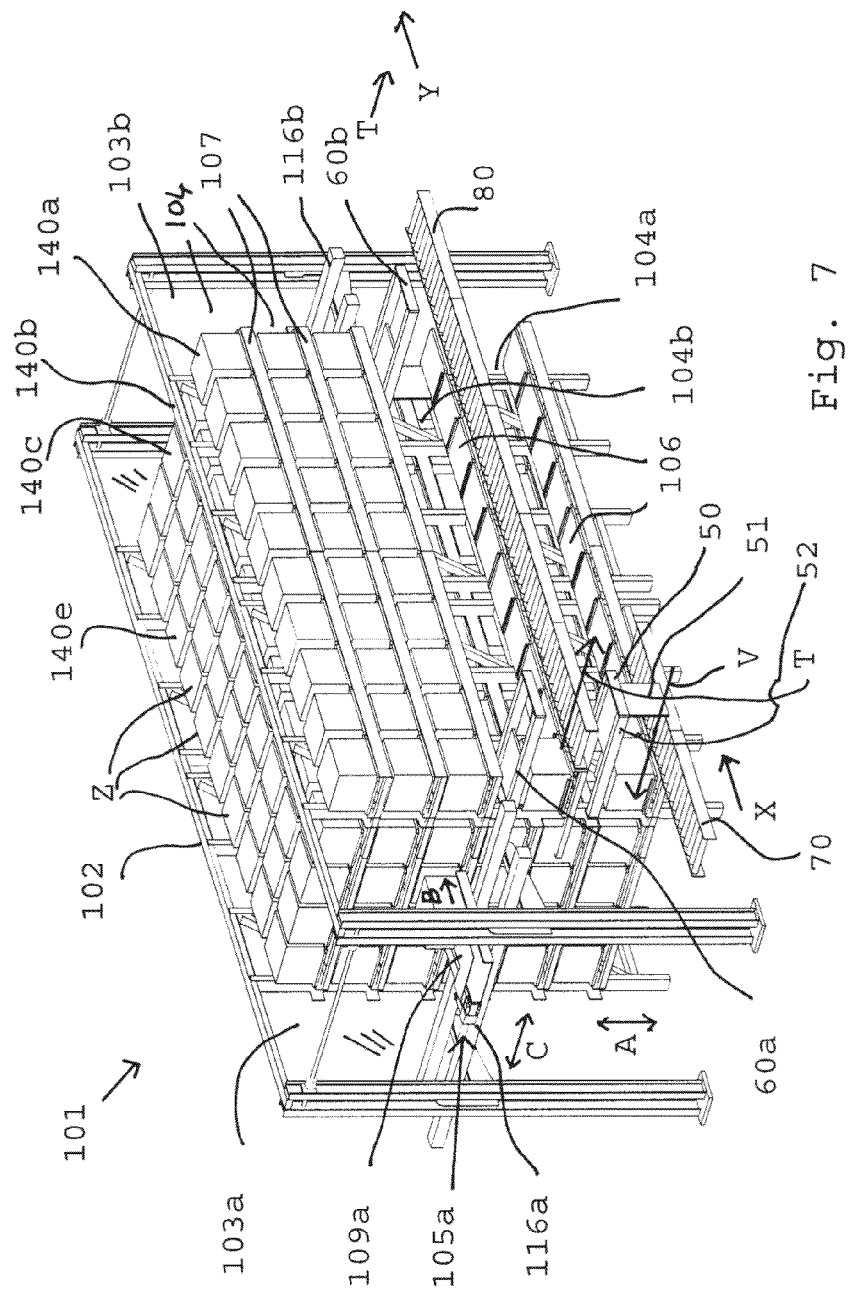

STORAGE AND/OR ORDER COLLECTION SYSTEM

BACKGROUND OF THE INVENTION

The invention relates to a storage and/or order collection or order picking system. The invention furthermore relates to a method for storing articles, particularly including order picking.

Storage and order picking systems are among others used in wholesale businesses, such as the trade in (spare) parts, and in retail businesses, such as apothecaries and supermarket delivery services.

An example of such a system is shown and described elaborately in applicant's International patent application PCT/NL2010/000015.

Said document describes a storage device with means for storing the articles and/or retrieving articles from storage, comprising a frame having a first series of mutually parallel elongated storage sections, preferably positioned in a column set-up, that extend between a first end and a second end of the frame, furthermore comprising a number of holders, such as carriers, for the articles, wherein the storage sections are provided with holder supports on which a number of the holders can be supported for storage of the articles, wherein at the first end and the second end of the frame first and second platforms, respectively, have been arranged which each are adapted for accommodating at least one holder, and first movement means for moving said platforms, preferably simultaneously, from the one storage section to another storage section, wherein the device is provided with second movement means for in a main direction parallel to the longitudinal direction of the storage section in question, horizontally moving one or more holders from the platform at the first end of the frame to the holder supports of a selected storage section while moving the holders on the selected storage section and moving one or more holders, preferably representing a same holder length, from the selected storage section to the platform at the second end of the frame, and vice versa. In case of storing an article, said article with holder can be taken into the selected storage section and in case of retrieving a wanted article from storage, said article can be taken with holder out of the storage section in question. In addition a holder loaded with an article can be present on the one platform and an empty holder on the other platform.

SUMMARY OF THE INVENTION

It is an object of the invention to provide a storage and order picking system and method that is able to function/can be carried out at high speed.

It is an object of the invention to provide a storage and order picking system and method that is able to function/can be carried out advantageously.

It is an object of the invention to provide a storage and order picking system and method that is able to function/can be carried out with a low risk of failure.

For achieving at least one of these objects the invention according to one aspect provides a device of the type as described in the preamble of claim 1, wherein the second movement means comprise first and second confining devices, particularly pushers, movable in the main direction and active at the first and second end, respectively, for gathering the holders present on the first platform and/or the holders present on the second platform and the holders situated in line therewith present in the selected storage section against each other in a contiguous series and keeping them so, during a joint movement, as a series, in the main direction, of the one or more holders from the one platform to the selected storage section, the holders on the selected storage section and the one or more holders from the selected storage section to the other platform, wherein the first and second confining devices are arranged for engagement of both holders situated at the outer ends of the said series, during the said movement thereof.

In that way a group of holders is formed, which can be moved as one unity quickly and in a controllable manner. In addition acceleration and deceleration of the series of holders, kept confined between the confining devices, can be carried out controlled and quickly.

In a simple embodiment the first and second confining devices are provided on the first and the second platform, respectively, so that they always move along with the platforms and are present at the wanted location.

Preferably the first and the second confining devices are provided with stops for the holders, which stops face each other. They will then be active by exerting contact pressure on the holders.

In a simple embodiment the confining devices engage onto surfaces of the holders at the end of the series of holders, which surfaces face away from each other, such as on upright end surfaces formed by upright legs of U-shaped holders which with the upright legs are transverse to the series direction.

Alternatively the confining devices can be provided with a confining member that is movable between an inactive position and an active position, in which the confining member actively engages onto or into the holder. The confining member can for instance be a retractable/extendable pin, that engages into a recess in the holder.

The second movement means can comprise first drive means for moving the first and second confining devices towards each other, can furthermore comprise second drive means for moving the confining devices simultaneously in the same series direction, can furthermore comprise third drive means for moving the first and second confining devices away from each other. The second movement means can comprise a control unit for each time mutually adjusted control of the first and/or second and/or third drive means active on the first and second confining devices, respectively. The first and/or second and/or third drive means preferably comprise a first and a second servomotor for the first and the second confining devices, respectively.

The second movement means on the first and second platform can be provided with a first and second, preferably endlessly circulating drive element, respectively, such as belt, chain or band, which also forms a moving support for holders present on the first, second platform and drives the first, second confining device. The confining device can then be directly attached to the belt, etcetera. The confining devices follow the movement of the drive elements.

Alternatively the second movement means on the first and second platform can be provided with a first and second drive element, respectively, such as a linear drive or a circulating drive element, such as belt, chain or band, which directly drives the first, second confining device, wherein the first, second platform is provided with stationary supports for the holder.

By driving the drive element the holder supported by it is moved in the one direction or in the opposite direction. The said first, second and third drive means can be active on the first and second confining devices via the first and second drive elements, so that the drive as a whole can be compact.

Both platforms can be adapted for supporting more than one holder.

According to a further aspect the invention provides a method for storing articles in storage, and/or retrieving articles from storage, wherein the articles are stored in a device, particularly a device according to the invention as described above, which device comprises a frame having a first series of elongated storage sections placed parallel to each other and extending between a first end and a second end of the frame, furthermore comprising a number of holders for the articles, wherein the storage sections are provided with holder supports on which a number of the holders can be supported for storage of the articles, wherein at the first end and the second end of the frame a first and a second platform, respectively, have been arranged, wherein in case of storage a supplied article is placed on a holder and with the holder is taken by the first platform to a selected storage section, the holder in question is received from the first platform on the holder supports of said storage section while discharging another, particularly empty, holder from said same storage section to the second platform, and in case of retrieving from storage the process is followed the other way around, wherein after the first and the second platform have been brought in line with the selected storage section, the holders that are present on the first and second platform and the selected storage section are pushed against each other into a contiguous series and are moved as a contiguous series, during which movement the series at both ends of the series is kept confined, until the desired discharge and/or reception of a holder to or on, respectively, the selected storage section has taken place.

The device according to the invention described above can be advantageously be used here.

In a first phase at both ends of the series a first confining device and a second confining device, respectively, can be moved towards each other while forming the contiguous series of holders and in a second phase the first and second confining devices can be moved in equal sense while taking along the series of holders present in between them. The series is thus kept intact during movement of the series.

As the series of holders is kept intact, the series can be subjected to high acceleration forces and deceleration forces without malfunctioning, as a result of which the desired movement can be realised fast. The second phase can comprise an acceleration phase and deceleration phase, preferably with a phase of uniform speed in between, wherein the second phase preferably starts at speed zero and ends at speed zero.

After the desired discharge or reception, respectively, of one or more holders has taken place, the series can be interrupted by moving the holders then present on the first and second platform away from the storage section. In that way it can be ensured that no holder is left behind on the transition between platform and storage section and the platforms can safely be moved to another storage section.

It is preferred here that in an—in that case third—phase the first and second confining devices are moved away from each other again.

In a first further embodiment the holders on the first and second platform are supported by first and second supports, respectively, which are driven for carrying out the desired movement of the holders, wherein the first and second confining devices are moved along with the first and second supports. The first and second supports can then be designed as driven endless support elements, such as driven conveyor belt, string conveyor or chain conveyor, wherein the first and second confining devices are driven by the first and second supports.

In a second further embodiment the holders on the first and second platform are supported by first and second supports, respectively, which are stationary in the platform, and the movement of the holders is effected by the direct driving (that means without the intermediary of the driven support element mentioned earlier, that is not present now) of the confining devices and the holders are shifted over the stationary supports. The first and second supports can be designed as support strips for supporting the holders.

In accordance with a further elaboration of the method according to the invention at another selected storage section the process is repeated, in the opposite sense, wherein a holder of the second platform is received on the storage section while discharging a holder, particularly a holder containing an article, from the storage section to the first platform.

The holders have a length in the direction of the storage section that is a singular or multiple of a module size, wherein the holders preferably have a horizontal dimension in the direction of the storage section that is a singular of a module size: all holders then have the same length. Each storage section is then able to support a number of N1 holders, wherein the number of storage sections is N2, wherein the number of holders in the device is at least N1×N2+1. All storage sections are in that case occupied with holders, wherein at all times a holder can be replaced in the manner described above. Preferably the number of holders in the device is at least N1×N2+2, in which way a higher speed can be achieved. Preferably the number of holders is N1×N2+N3, wherein N3 is the maximum number of holders that a platform is able to contain.

If one or several holders have a length of a multiple of the module size, then, in case of a given number of storage sections of N2 and a number of module sizes of N4 per storage section, the overall length occupied by holders can be at least N2×N4+1, preferably N2×N4+2. With N5 for the maximum number of module sizes that a platform may contain, a preferred embodiment will come to an overall occupied length of N2×N4+N5.

It may be so that at the end of discharging a holder to a platform or discharging a holder to a storage section, a holder extends over the narrow spatial transition (slit) between platform and storage section. If the platform would then be moved to another storage section this could result in failure. In order to prevent this to a large extent, the invention provides a storage device for storing articles and/or retrieving articles from storage, according to the preamble of claim 1, wherein between the first platform and the selected storage section a first spatial transition is present and between the second platform and the selected storage section a second spatial transition is present, wherein the holders each have an engagement surface that has one or more normals having a horizontal directional component parallel to the storage section, wherein the device at least near the transitions is provided with engagement devices and first engagement device drive means for bringing the engagement device in question in and out of engagement with the engagement surface on a holder, and with second engagement device drive means for moving the engagement device and therewith the holder in a main direction parallel to the longitudinal direction of the selected storage section, in order to move the holder from a position in which it is situated in the transition in question, extending to up onto the storage section or at least to near the storage section, into a position in which it is situated entirely free from the storage section and preferably situated entirely outside of the transition, fully on the platform.

In that way the holder in question is removed from the transition in a reliable manner. The risk of interference of the frame of the storage sections with a holder that is situated on a platform that is moved relative to the storage sections, is thus considerably reduced.

In a simple embodiment the engagement devices and the first and second engagement device drive means are arranged on both platforms.

The engagement devices can be movable by the first engagement device drive means in a direction transverse to the main direction, particularly in a vertical direction.

The engagement surface can have any suitable shape, adapted to the engagement device. The engagement surface can be part of a recess in the holder and the engagement device fits in the recess. For instance in case of a pin having a circular cross-section, the engagement surface can be concave according to a matching circle. Alternatively the pin can be a flat strip, and the related engagement surface is flat.

The first and/or second engagement device drive means can be operated separately from the second movement means.

According to a further aspect the invention for that purpose furthermore provides a method according to the preamble of claim 18, wherein, after the desired reception/discharge at the storage section in question has taken place and before a platform of the storage section in question is moved to another storage section, a holder extending in or over the transition between the storage section in question and the platform is urged onwards on the platform in a separate movement in order to vacate the transition.

The separate movement can take place by positive force-closed engagement of the holder, particularly by retraction.

Preferably the separate movement takes place until the holder has fully arrived on the platform.

According to a further aspect the invention provides a method according to the preamble of claim 18, wherein the movement of holders away from the storage section or onto the storage section takes place by shifting the holders over the stationary holder supports in the storage section and in the platforms. Preferably, after the first and the second platform have been brought in line with the selected storage section, the holders present on the first and second platform and the selected storage section are pushed against each other into a contiguous series and are moved as a contiguous series, during which movement the series at both ends of the series is kept confined, until the desired discharge and/or reception of a holder to or on, respectively, the selected storage section has taken place.

It is noted that the device according to the invention can be provided with sensors, such as a photocell, provided on the platforms, for detecting a load on a holder, so that the control unit is informed of whether or not a holder is loaded. One or both platforms can furthermore be provided with a photocell that is oriented in the direction towards the other platform in order to inform the control unit whether none of the holders on a storage section are loaded.

According to a further aspect the invention provides a storage device for the storage of articles and retrieving articles from storage, comprising a frame having a first series of mutually parallel elongated storage sections, positioned in a column set-up, that extend between a first end and a second longitudinal end of the frame, furthermore comprising a number of holders, such as carriers, for the articles, wherein the storage sections are provided with holder supports on which a number of the holders can be supported for storage of the articles, wherein at the first end and the second end of the frame first and second platforms, respectively, have been arranged which each are adapted for accommodating at least one holder, and first movement means for moving said platforms, preferably simultaneously, from the one storage section to another storage section, wherein the device is provided with second movement means for horizontally moving at least one holder from the platform at the first longitudinal end of the frame to the holder supports of a selected storage section while moving one or more holders, preferably representing a same holder length, from the selected storage section to the platform at the second longitudinal end of the frame, wherein the device has main sides or longitudinal sides extending between the frame ends and wherein at least one of the storage sections is an entry section and at least one of the other storage sections is an exit section, wherein the device at the location of the entry section is provided with at least one feeder device and at the location of the exit section is provided with at least one discharge device, which feeder device is provided with an entry displacer, particularly a pusher, for in a first transverse direction transverse to the elongated entry section transferring an offered article to be stored, onto a holder present in the entry section and which discharge device is provided with a discharge displacer, particularly a pusher, for in a second transverse direction opposite the first transverse direction, transverse to the elongated exit section transferring an article to be discharged present on a holder in the exit section to a discharge position outside of it.

In that way a storage device is provided with an efficient use of space.

In one embodiment the feeder device is arranged on the frame, preferably near a longitudinal end of the frame, preferably contiguously to the longitudinal end. The distance to a platform will then be very short, which is advantageous to the speed of the storage process.

In case near both the first longitudinal end and the second longitudinal end a feeder device is arranged, preferably contiguously to the longitudinal end in question, use can be made of the nearest platform for storage, in which way speed in gained.

Comparable considerations are applicable to the discharge device, which will then be arranged on the frame, wherein preferably the discharge device is arranged near a longitudinal end of the frame, preferably contiguously to the longitudinal end, wherein preferably, near both the first longitudinal end and the second longitudinal end a discharge device is arranged, preferably contiguously to the longitudinal end in question. In that case the speed of the exit and discharge is enhanced.

In a further embodiment the device comprises an entry track and an exit track, which extend horizontally to adjacent the entry section and the exit section, respectively, to at least within the operational area of the feeder device and the discharge device, respectively. The entry track or the exit track can also extend between both (optional) feeder devices or discharge devices, respectively, as a result of which the entry or the exit is enhanced.

In the frame, adjacent to the first series of storage sections positioned in a column set-up, further series of storage sections positioned in a column set-up can be present, wherein the frame is provided with third movement means for in horizontal direction moving the platforms from the longitudinal end of the one series to the longitudinal end of another series and the platforms are vertically movable by the second movement means along the longitudinal ends of the further series of storage sections. The device then comprises a series of columns of storage sections wherein at the longitudinal ends the platforms are active and on one longitudinal side entry and exit take place.

In a compact embodiment the entry section and the exit section can be situated directly above one another.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

BRIEF DESCRIPTION OF THE DRAWINGS

The invention will be elucidated on the basis of a number of exemplary embodiments shown in the attached drawings, in which:

FIG. 7 shows an isometric view of another exemplary embodiment according to the invention.

DETAILED DESCRIPTION OF THE DRAWINGS

Figure 1A:
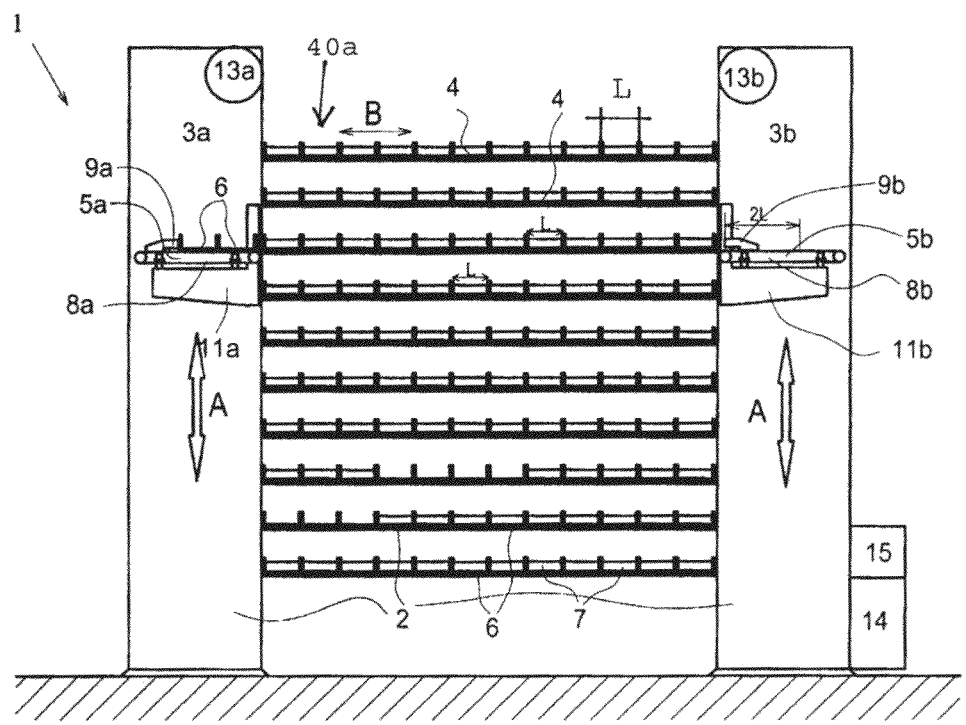
FIGS. 1A-C schematically show a front view, top view and side view, respectively, of an exemplary embodiment of a known device, for illustration purposes.
Figure 1B:
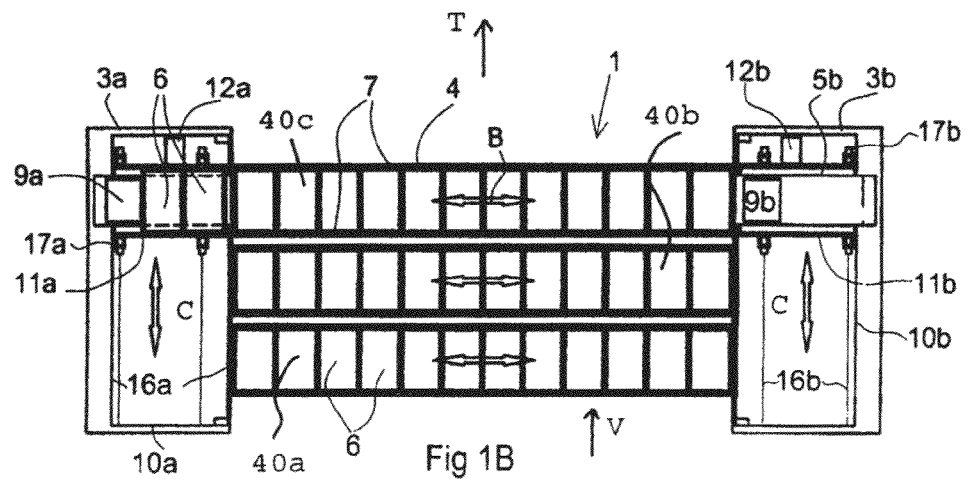
Figure 1C:
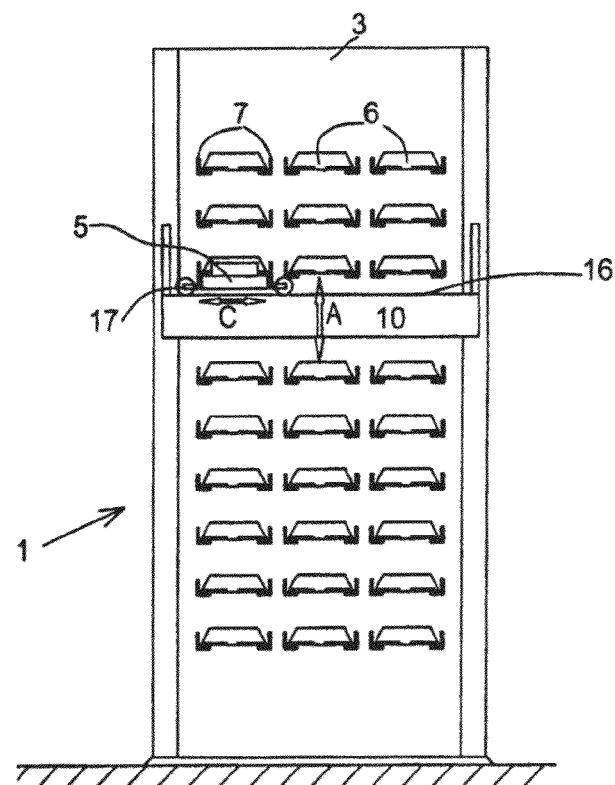

The known device 1 shown in FIGS. 1A-C is substantially column-shaped and comprises a frame 2 having two elevator shafts 3a,3b at two longitudinal ends and elongated storage sections borne in between them, in this case storage levels 4, for instance nine or ten of those, which in this example are positioned in three columns 40a,b,c. In each elevator shaft 3a,b a platform 5a,b is accommodated, which can be moved up and down, direction A, by electromotors 13a,b. In the device 1 a number of carriers or holders 6 for articles are housed, that may for instance be U-shaped, with the upright legs transverse to the longitudinal direction of the storage sections.

Figure 4:
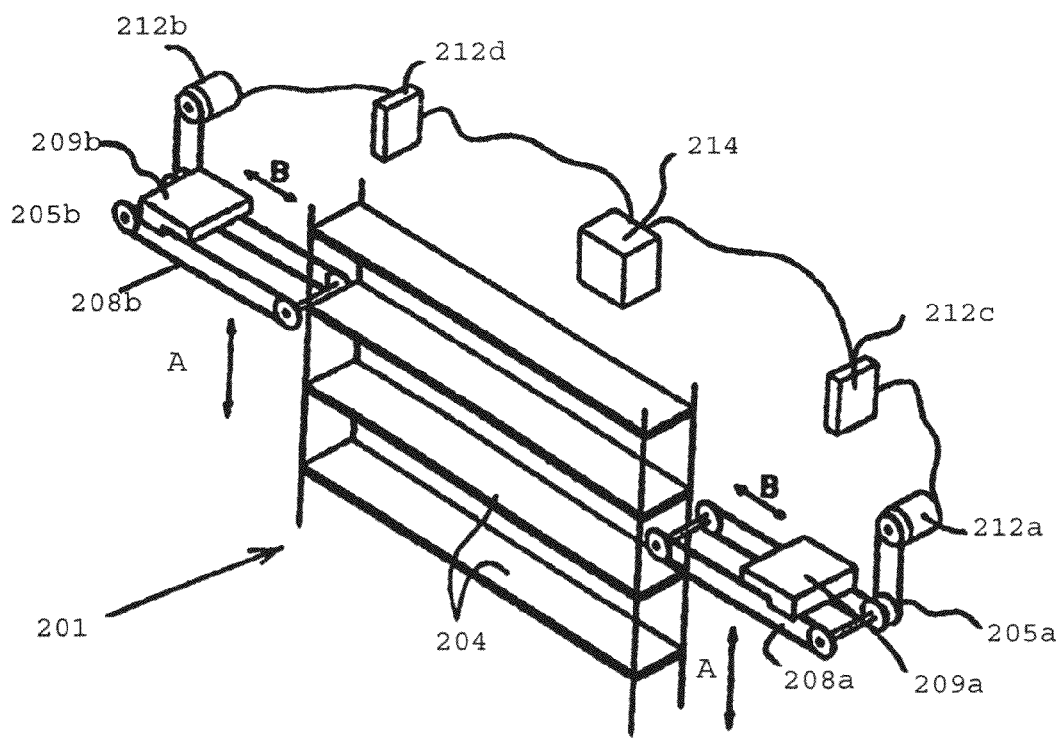
FIG. 4 shows a schematic view of a drive concept for a device according to the invention.

Each platform 5a,b is supported on a frame 11a,b and comprises a belt conveyor 8a,b that is drivable by means of servomotors 12a,b, also see FIG. 4. On the belts 8a,b pushers or confining devices 9a,b are attached for joined movement with said belt. The belts 8a,b have a support surface with a length of approximately 2 L, wherein L is the length of a holder 6, measured in main direction or longitudinal direction of a storage level 4, in this example corresponding with a module size.

The frames 11a,b with platforms 5a,b are supported on a frames 10a,b by wheels 17a,b, on which frames the electromotors 13a,b via for instance a drive belt (not shown) are drivingly active to move them up and down, directions A. The frames 10a,b can be moved in the direction C over rails 16a,b by means of electromotors, not shown, provided on the platforms.

Each storage level 4 comprises two support profiles 7, on which a series of holders 6 is supported, in a way so as to be easily shiftable in the direction B. The support profiles 7 have a support length of at least approximately a whole number of lengths L of the holder 6, in this example 12 L.

For controlling the said electromotors, including servomotors 12a,b, a control unit 14 with programmable computer 15 is present.

The holders 6 are provided with unique identification marks, such as a barcode. For reading the barcodes sensors are present that are functionally connected to the control unit 14/computer 15. In the control unit 14 a connection can be made between a holder and an article placed thereon, so that it is exactly known at what location in the device an article is situated and which article it is.

One of the storage sections 4 can be suitable for entry, for instance level 4a (FIG. 2A), and one for exit for instance level 4b. The entry level 4a and the exit level 4b can be situated at opposite main sides of the device 1, so that the direction of entry V can be the same as the direction of exit T, see FIG. 1B. The entry level and exit level are situated at a level, which to a person involved in entering/outputting is ergonomically advantageous.

Figure 2A:
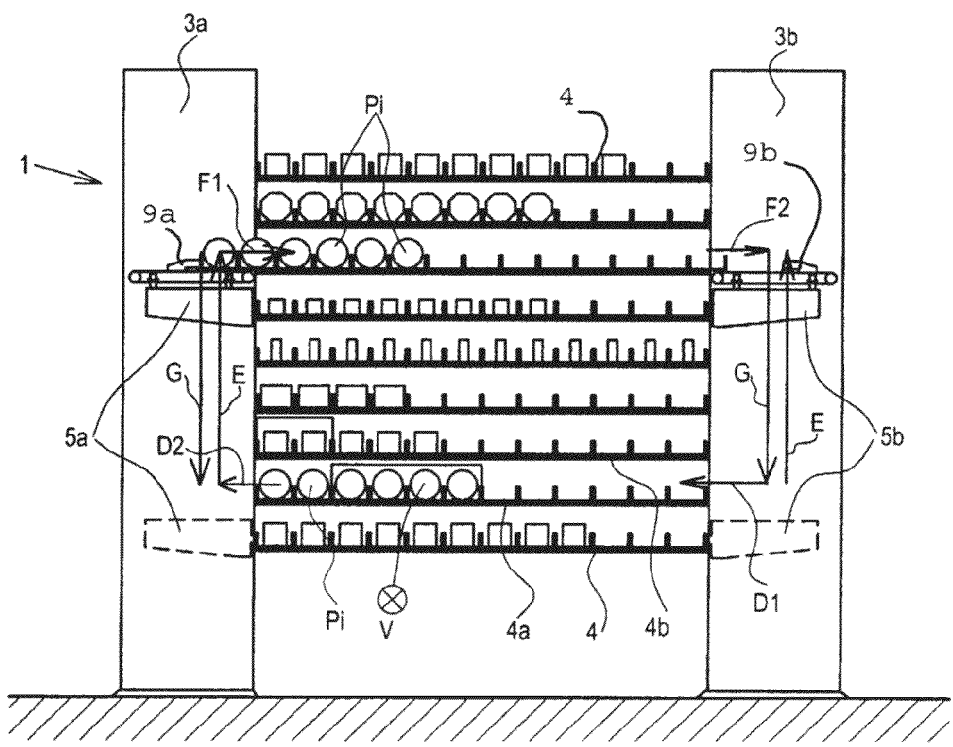
FIGS. 2A and 2B show a side view of a process of storing articles in the device of FIGS. 1A-C and a process of order picking in the device of FIGS. 1A-C, respectively.

Referring to FIG. 2A, when storing a group of identical articles Pi, the articles are placed in the direction V on or in the holders 6 of entry level 4a. The platforms 5a,b have been taken to the same level and in line with the entry level 4a. On the belt 8b there are two empty holders 6, on belt 8a none, so that the overall number of holders on platforms and storage levels is 3×9×12+2. After loading the belt 8b is activated. The pusher 9b pushes said holders 6 at the right-hand side of entry section 4a onto the support profiles 7 of the entry level (direction D1). Said pushing force is transferred via the holders 6 of said level to the two leftmost holders 6 that are each carrying an entered article Pi. All holders 6 thus shift onwards to the left, while discharging the two loaded holders 6 to the belt 8a, direction D2. The belt 8a can then be idle or be driven synchronously.

After both loaded holders 6 are placed on the belt 8a, the platforms 5a,b are lifted, direction E, to the selected storage level 4. When the latter is situated in a different column movement will also take place in the direction C.

When the platforms 5a,b have come to be in line with the selected storage level 4, the belt 8a is activated in order to urge the loaded holders 6 by means of pusher 9a to the right, direction F1, onto the support profiles 7 of said level. As a result, at the right-hand end two empty holders 6 are shifted from said section 4 onto the belt 8b (F2), in a comparable manner as described above for the left-hand end. After the loaded holders 6 have been discharged the platforms 5a,b can be moved downwards again, direction G, in order to be brought in line again with entry level 4a, after which the same process can start over again. This can be repeated as long as there are still empty holders at the selected storage level. After that another storage level can be used.

Figure 3A:
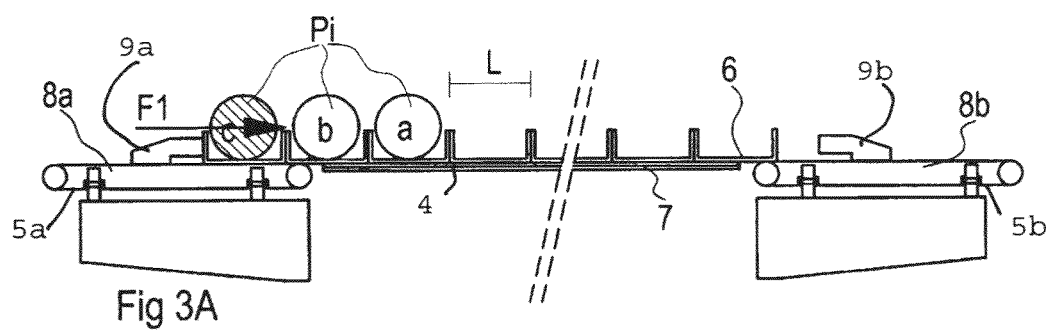
FIGS. 3A-C show some details of an example of a process of transferring articles within a device according to FIGS. 1A-C.
Figure 3B:
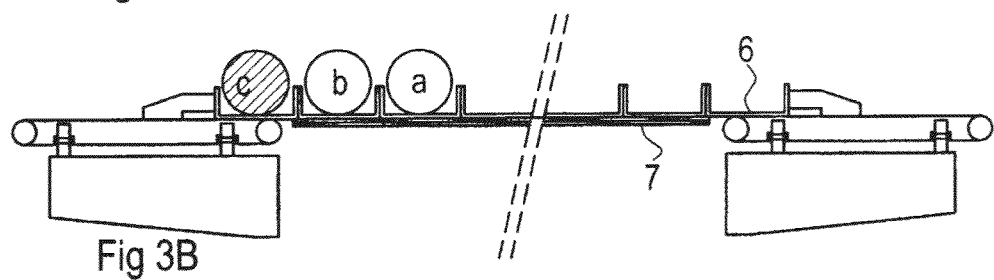
Figure 3C:
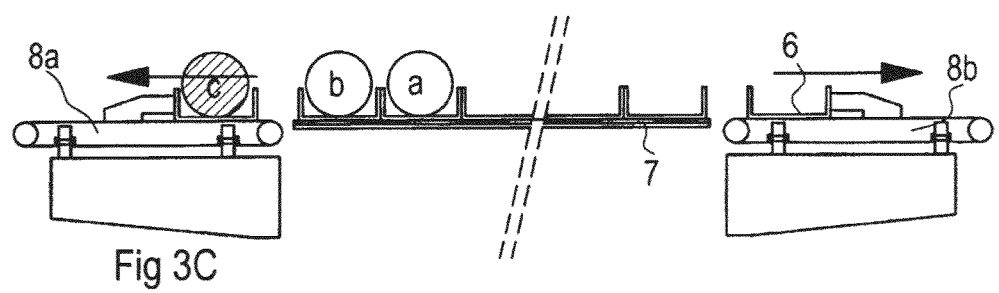

If the articles Pi are different and for that reason have to be stored at different storage levels, platform 5a will be used for first discharging one article Pi to the one selected storage level, and subsequently the next, different article at another selected storage level. This is for instance shown in FIGS. 3A-C, where the article b is discharged to a storage level, but a different article c is still kept on the belt 8a. As shown, at the end of discharging, the belts 8a,b can be driven slightly in a opposite manner, in order to make the holder 6 with article c and the empty holder on belt 8b entirely free from the storage level, before moving the platforms 5a,b.

It is also possible to assign storage levels to certain destinations. In that case for instance identical articles Pi can be distributed over different levels. Other, different articles Pi can then be distributed over the same levels, or over a part thereof. Thus on each assigned level an individual collection of articles is brought together, also placed in groups.

Figure 2B:
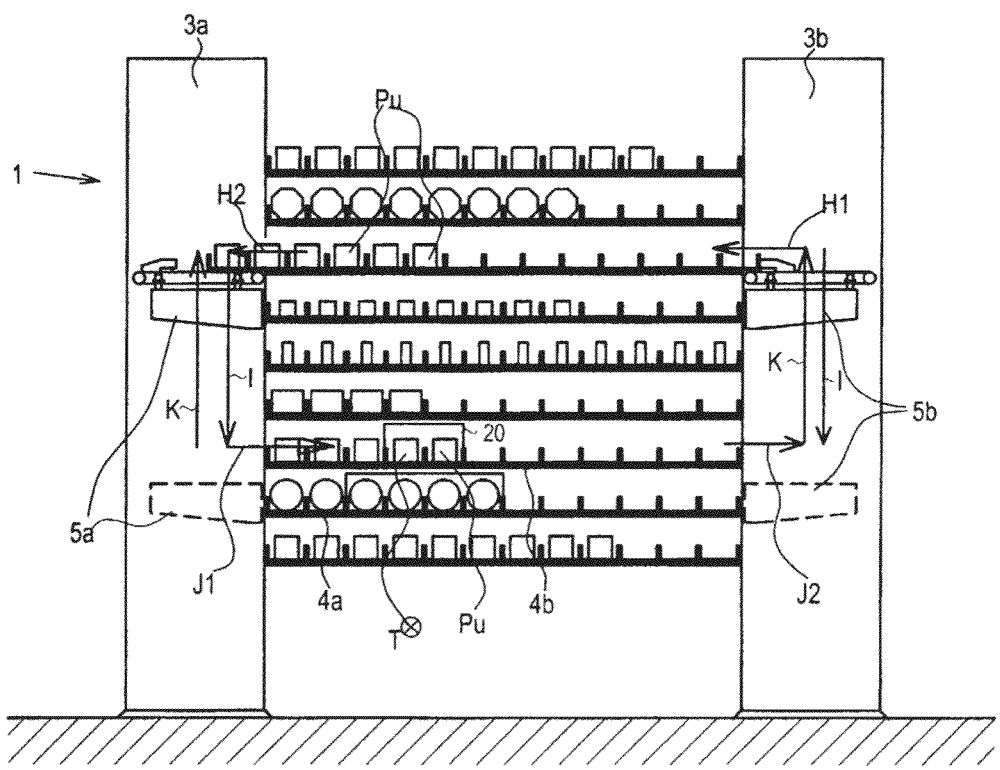

For picking an order of for instance articles Pu the platforms 5a,b are brought in line with the selected storage level 4 (FIG. 2B). Belt 8b is subsequently driven in order to push the empty holders 6 on it to the left, direction H1, by means of pusher 9b. As a result thereof at the left-hand end, two loaded holders 6 are urged onto the belt 8a, direction H2. Subsequently the platforms 5a,b are moved downwards, direction I, until they are in line, optionally after movement in direction C (FIG. 10), with exit level 4b. At that location the belt 8a is activated, so that by means of the pusher 9a two loaded holders 6 are urged in the direction J1 onto the support profiles 7 of the exit level 4b. As a result thereof at the right-hand end two empty holders 6 are pushed onto the belt 8b, direction J2. After the loaded holders have been discharged to the exit level 4b the platforms 5a,b can be moved upwards again, direction K, in order to be brought in line again with the level where the articles have to be removed, after which the same process can start over again.

When the order is ready, or room has to be made, the articles Pu can be removed in the direction T from the exit level 4b, via passage 20.

It is also possible to make an order of different articles, for which purpose articles are taken from different storage levels in the described manner and are placed on the exit level.

In the aforementioned case of placing the articles in groups on assigned levels, the collection has already taken place and for instance the entire group can be transferred in steps from one level to the exit level.

It is noted that instead of being loaded with singular articles, the holders can also be loaded with a multiple of articles, or a combination of articles, for instance a package of medicines customized to a patient.

It is furthermore noted that the holders 6 can also be designed so as to be multiple, having multiple compartments.

For facilitating in a direction transverse to the main direction of a storage section the holders can be substantially U-shaped, wherein the legs form upright edges or walls that are transverse to said main direction.

On the basis of FIGS. 4, 5A-F and 6A,B an embodiment according to the invention of the discharge/reception process of holders to/from a storage level/storage section will be elucidated. The exemplary embodiments and exemplary processes discussed above on the basis of FIGS. 1-4 will serve as starting point and as far as not contrary can be applied accordingly.

FIG. 4 schematically shows a device 201 which as regards set-up largely corresponds with the previous devices. The device 201 is also column-shaped, having a number of storage sections or storage levels 204. At both longitudinal ends of the storage sections 204, platforms 205a,b can be moved in directions A, in accordance with what has been discussed above. The platforms 205a,b each comprise a belt conveyor 208a,b on which a pusher or confining device 209a,b provided with a holder stop is attached.

For driving in the directions B the belt conveyor 208a,b is operationally connected to a servomotor 212a,b. They are controlled by servocontrols 212c,d which in turn are controlled by a computer programmable control unit 214 (with which the other drives in the device are also controlled, as discussed above).

Figure 5A:
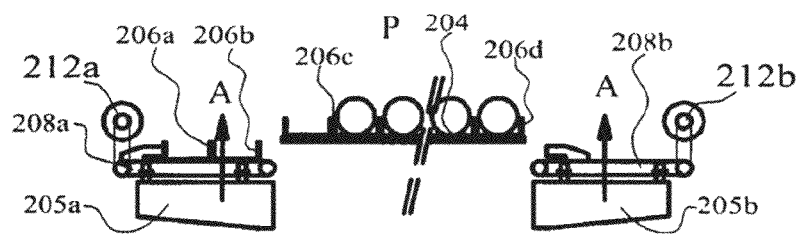
FIGS. 5A-F show a number of consecutive phases in the process of discharging a holder to a storage section using the drive concept of FIG. 4 or comparable.

FIG. 5A shows that the platforms 205a,b are taken upwards to a selected storage section 204. Platform 205a carries two empty holders 206a,b, platform 205b is empty.

Figure 5B:
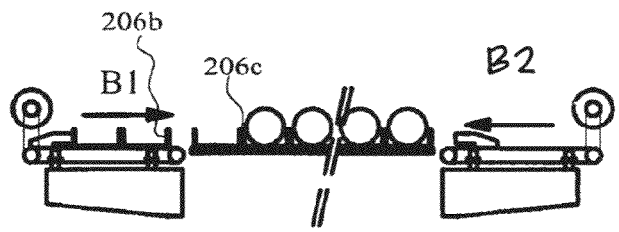
Figure 5C:
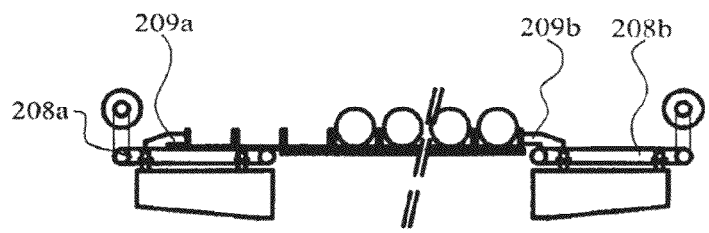

In FIG. 5B the conveyor belts 208a,b are aligned with the storage section 204. Subsequently the servomotors 212a,b are activated oppositely by the control unit 214, so that the belt 208a moves in the direction B1 and the belt 208b moves in the opposite direction B2. As a result thereof the holders 206a,b and also the confining device 209a move until the holder 206b abuts the holder 206c on storage section 204. The confining device 209b also moves until its abutment surface or abutment edge abuts the outer side of the upright leg of the U-shaped holder 206d at the other end of the storage section 204, FIG. 5C. Should there have been any play left between the confining device 209a and the holder 206a, said play is ended as the belt 208a is still driven for a short while until the confining device 209a with its abutment surface or abutment edge abuts the outer side of the upright leg of the U-shaped holder 206a as well. A series of holders 206 that is contiguous in transport direction and held confined at the ends has now been formed between the confining devices 209a,b. The confining devices 209a,b push towards each other with slight pressure, wherein the control unit 214 detects an experienced pre-set (threshold) resistance and the running drive of the servomotors 212a,b is then stopped.

Figure 5D:
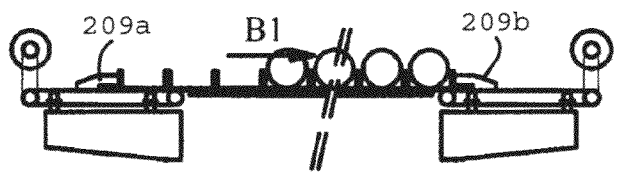
Figure 5E:

Immediately after that the control unit 214 controls the servomotors 212a,b synchronously in the same direction B1, see FIG. 5D. The series of holders 206 is and remains confined between the confining devices 209a,b, moved as one unity with the confining devices. The servomotors can be accelerated and decelerated again at high speed, so that the wanted movement takes little time. As soon as the realisation of the wanted movement has been established, on the basis of absolute encoders for the servomotors 212a,b, which wanted movement has been calculation/determined by the control unit 214 on the basis of the storage details (in this case it is desired to retrieve one article from this storage section), the running drive of the servomotors 212a,b is stopped, FIG. 5E. At that moment the holder 206d is largely supported on the belt 208b.

Figure 5F:
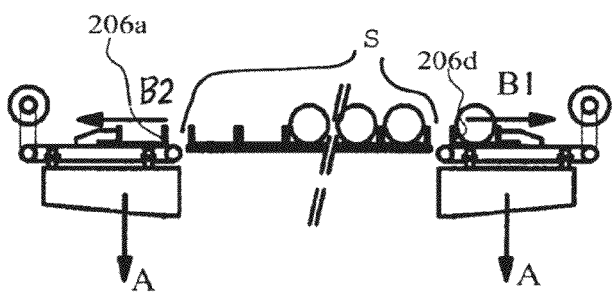

Immediately after that, FIG. 5F, the control unit 214 controls the servomotors 212a,b again, now however to move the belts 208a,b slightly apart, in opposite directions B2 and B1, wherein the confining devices 209a,b are passive. As soon as for instance by means of a proximity sensor it is detected that the holders 206a and 206d have been fully accommodated on the platform 205a,b said control is stopped again. The holders on the platforms are then entirely outside of the transition between the platform and the storage section. The platforms 205a,b can then be moved to another level again, direction A, while transporting a holder 206d.

The described process can also be carried out the other way round, wherein platform 205b supplies a holder with article that has to be placed in the storage section 204.

The confining devices according to the invention can be designed like the pushers discussed above, but can also be designed differently, for instance like a hook moving along with the belt 208a,b or as a flight engaging into a recess on the holder.

The confining devices can also partially take over the function of the conveyor belts when they themselves are directly driven and a stationary support for the holders is provided on the platforms. This is shown in an exemplary embodiment in FIGS. 6A and 6B.

These figures show a platform 305b (platform 305a is designed accordingly) at the level of a storage section 304. The platform 305b is provided with fixed guides 308b, on which the edges of the holders 306 may rest in a slidable manner. The pusher/confining device 309b can be driven by a belt or string 330b, that is driven by a motor 312b that is part of a control arrangement in accordance with the one of FIG. 4. It is noted that use can also be made of a linear drive for the pusher/confining device 309a,b.

In accordance with what has been described above for FIG. 5D, by driving the pusher/confining device 309a on platform 305a, the desired number of holders 306 is pushed from the storage section 304 onto the platform 305b, and by driving the pusher/confining device 309b on platform 305b is pushed from the storage section 304 onto the platform 305a. Both pushers/confining devices can in that case be utilised for the formation, acceleration, shifting and deceleration of a contiguous series of holders, in the manner in accordance with what has been described above in connection with FIGS. 4 and 5A-F.

As in this case there is no drive belt, it may be so that at the end of shifting the series of holders 306 the holder 306d (that may be the only holder to be discharged or the rearmost (last) of a number of holders to be discharged) still extends over the slit S (second transition) between the platform 305b and the storage section 304. When the platform 305b is moved (direction A or C) the holder 306d might get stuck at the edge of the storage section. This may also happen if the holder extends close to the storage section, but the other storage sections as a result of deformations that have appeared or play extend slightly further into the transition. The holder 306d is now made free from the slit by means provided for that purpose on the platform 305b (the platform 305a is provided with a similar facility for freeing the holder 306a from the first transition).

Figure 6A:
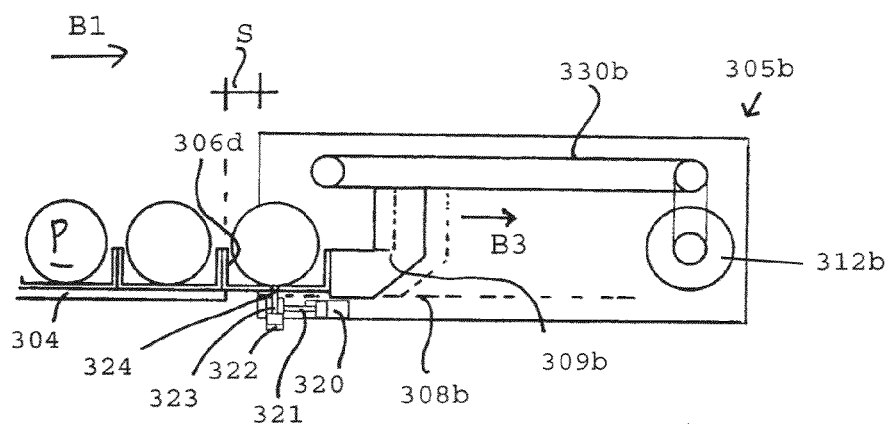
FIGS. 6A and 6B schematically show an alternative embodiment of a platform for a device according to the invention having a facility according to the invention for keeping the transition between platform and storage section free, in two stages of use.
Figure 6B:
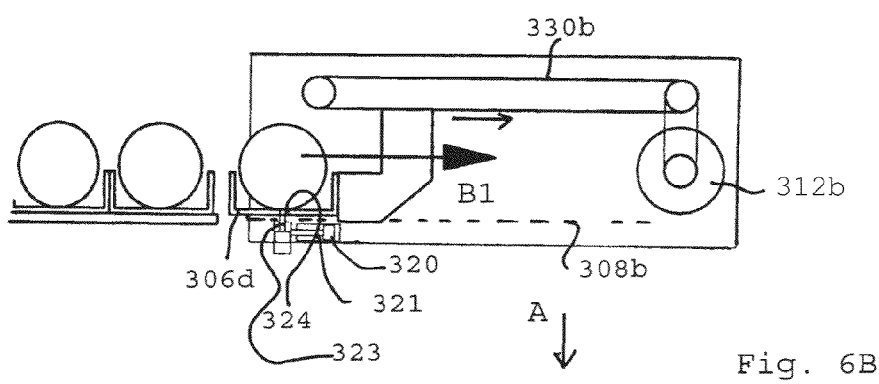

In FIGS. 6A and 6B said means are shown in a possible embodiment. A cylinder 320 has been arranged on the platform 305b, on the horizontally moveable piston rod 321 of which cylinder, a cylinder 322 has been attached. Its vertically moveable piston rod forms a pin 323 that may fittingly extend in a hole 324 for that purpose in the holder 306d.

In the situation of FIG. 6A, at the end of the movement of the series of holders 306 to the right, the pin 323 is situated directly below the hole 324. The control unit 214 first lets the pusher/confining device 309b move to the right over a short distance, for instance 2 cm (B3, see dashed lines in FIG. 6A). Simultaneously or subsequently the control unit lets the cylinder 322 (first engagement device movement means) insert the pin 323 (engagement device for the holder) upwards in the hole 324, and subsequently lets the cylinder 320 (second engagement device movement means) retract the rod 322, as a result of which in a separate additional movement the holder 306d is pulled further onto the platform 305b, largely (as depicted) or entirely free from the slit S, see direction B1 in FIG. 5B, up against the confining device 309b of which the position is known. A comparable process can take place simultaneously at the location of the slit at platform 305a, for holder 306a, then in direction B2.

After the holders 306a and 306d have thus been accommodated on the platform 305a,b the platforms 305a,b can be moved failure-free to another level, direction A, while transporting the holder 306d.

In FIG. 7 a storage device 101 according to the invention is shown, which contains a number of columns 140a-e with parallel, elongated storage sections 104 in a frame 102. The principles of exemplary embodiments and exemplary processes discussed above on the basis of FIGS. 1-4 are the starting point here and as far as not contrary can be used accordingly. This also applies to the movement process according to the invention as described in an example on the basis of FIGS. 4-6.

Column 40a is situated at the longitudinal side where the entry V and exit T also take place, transverse to the longitudinal side. The column 140a has an entry section 104a and an exit section 104b. An entry track 70 extends up to the longitudinal side and an exit track 80 extends along the full longitudinal side.

At the left-hand end of entry section 104 a feeder device 50 is attached in the frame 102, with which feeder device an article Z can be shifted from the entry track 70, in the direction V onto a holder 106 in the entry section 104a. In this example the feeder device 50 comprises a plate 51 for that purpose that can be shifted along an outrigger 52, by means of for instance a cylinder assembly and can push against the box Z.

Discharge devices 60a,b are attached in the frame at both the left-hand end and the right-hand end of exit section 104b. In that way an article Z can be shifted from a holder 106 in the exit section 104b onto the exit track 80. The discharge devices 60a,b can be designed similar to the feeder device 50, that means with a plate, however operational in the direction T, opposite V.

Each storage section, entry section, exit section 104, 104a, 104b, comprises two rails 107 on which U-shaped holders or carriers 106 are supported in a slidable manner. The U-shaped holders 106 have upright walls or legs oriented transverse to the longitudinal direction of the storage section.

The holders 106, when loaded, each carry a storage box or archive box Z provided with a unique barcode.

At the longitudinal ends or transverse sides of the storage device 101 platforms 105a,b are arranged, that can be designed in accordance with the platforms discussed earlier, with belts 108a,b see FIG. 8A-C, and each able to carry two holders 106. In FIG. 7 it is shown that the platforms are provided with pushers 109a,b, that are operated by cylinders that are not shown, wherein the holders 106 are shifted over fixed rails. The platforms 105a,b can be moved simultaneously, up and down (A) and reciprocally (B).

Figure 8A:
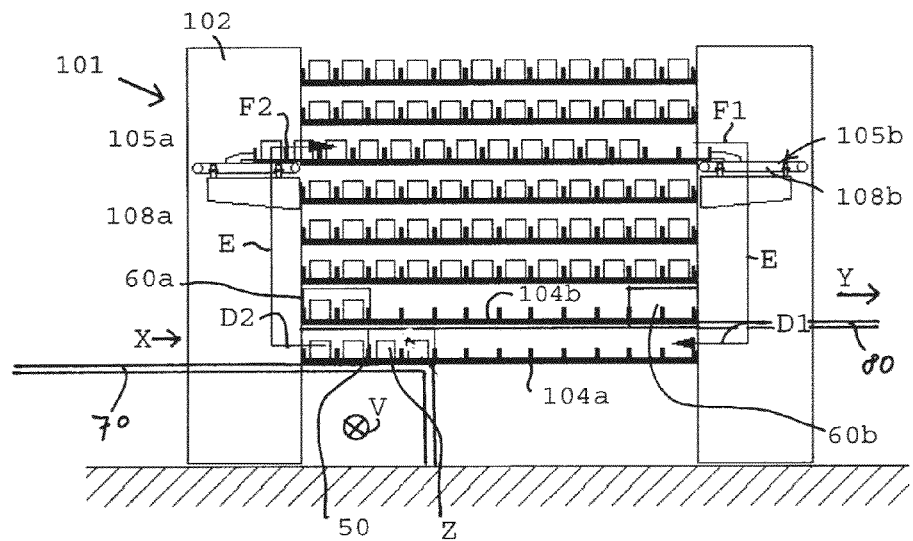
FIG. 8A-C show a number of stages in the use of the device of FIG. 7.
Figure 8B:
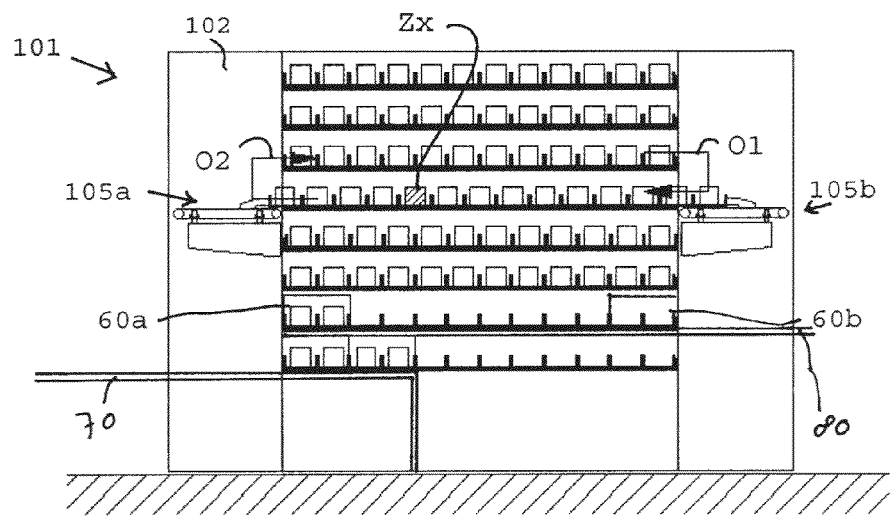
Figure 8C:
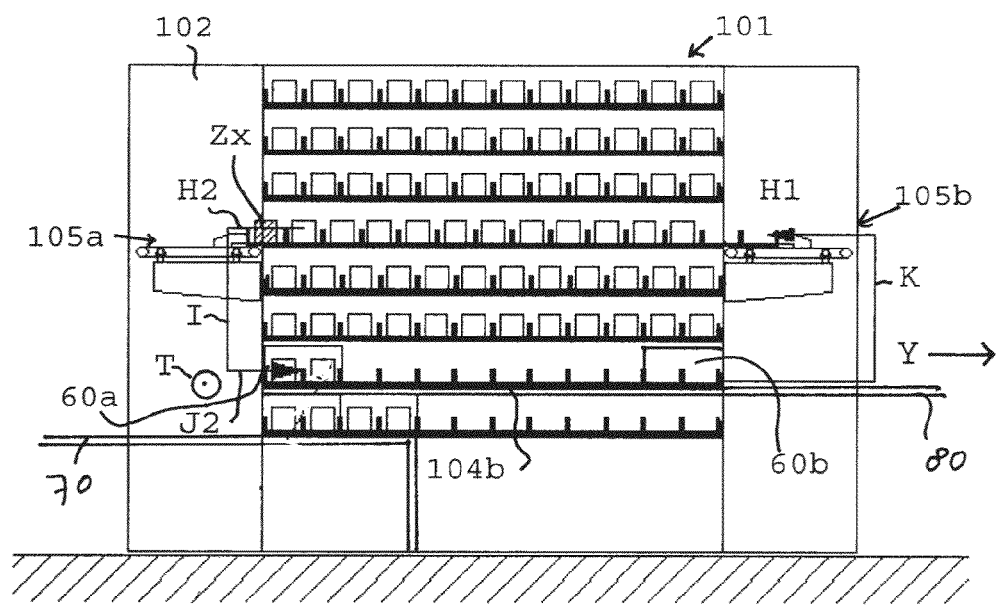

By way of example the device 101 can be used as follows, see FIGS. 8A-C. In FIG. 8A two boxes Z are shifted in the direction V by feeder device 50 from the entry track 70 (on which they have been supplied from direction X) onto holders 106 on entry section 104a. The platforms 105a,b are brought in line with entry section 104a, after which in the manner described above the first two holders 106 are shifted (D2) onto platform 105a, wherein from platform 105b two empty holders 106 are shifted (D1) onto the entry section. The platforms 105a,b are subsequently led to a storage section direction E, where the holders 106 including boxes Z are shifted (F2) onto said section, wherein two empty holders 106 are shifted (F1) onto platform 105b. This cycle is repeated for the boxes Z that have just (see beginning of this paragraph) been received in entry section 104a.

By means of scanning/storing the barcode and storing and tracking the positions of the holders 106, which each have their own unique code, the exact location of each box Z is known at all times in a central control unit. For retrieving for instance box Zx from storage, FIG. 8B,C by repeatedly carrying out a cycle of receiving/discharge, vertically and/or horizontally moving (A,C) the platforms 105a,b, between two (or more) storage sections, discharging/receiving, and moving again, see arrows O1,O2, the box Zx is moved step by step to the nearest longitudinal end, at least if a discharge device 60 is present there. In FIG. 8C the box Zx is accommodated by platform 105a (H2), and then downwards, direction I, taken to a position in line with exit section 104*b*, and then, direction J2, discharged to said section. Subsequently by means of discharge device 60*a*, the box Zx is shifted from the holder 106 in the direction T out of the exit section 104*b* and onto the exit track 80, for discharge in direction Y.

It is noted that the storage sections supporting the holders, instead of with rails can be provided with freely rotatable rollers, such as with a roller track. At the ends of the storage sections fixed rails or guide/support plates instead of rollers can be provided for sliding instead of rolling support of the holders.

The above description is included to illustrate the operation of preferred embodiments of the invention and not to limit the scope of the invention. Starting from the above explanation many variations that fall within the spirit and scope of the present invention will be evident to an expert.

The invention claimed is:

1. Storage device for the storage of articles and/or retrieving articles from storage, comprising a frame having a first series of mutually parallel elongated storage sections, positioned in a column set-up, that extend between a first end and a second end of the frame, furthermore comprising a number of holders for the articles, wherein the storage sections are provided with holder supports on which a number of the holders can be supported for storage of the articles, wherein at the first end and the second end of the frame first and second platforms, respectively, have been arranged which each are adapted for accommodating at least one holder, and first movement means for moving said platforms from the one storage section to another storage section, wherein the device is provided with second movement means for in a main direction parallel to the longitudinal direction of the storage section in question, horizontally moving at least one holder from the first platform at the first end of the frame to the holder supports of a selected storage section while moving one or more holders from the selected storage section to the second platform at the second end of the frame, and vice versa, wherein the second movement means comprise first and second confining devices movable in the main direction and active at the first end and the second end, respectively, for gathering the holders present on the first platform and/or the holders present on the second platform and the holders situated in line therewith present in the selected storage section against each other in a contiguous series and keeping them so, during a joint movement, as a series, in said main direction, of the one or more holders from the one platform to the selected storage section, the holders on the selected storage section and the one or more holders from the selected storage section to the other platform, and vice versa, wherein the first and second confining devices are arranged for engagement of both holders situated at the outer ends of the said series during the said movement thereof, wherein the second movement means comprise a first servomotor and a second servomotor for respectively moving the first and second confining devices towards each other and into engagement with both holders situated at the outer ends of said series, for moving the confining devices simultaneously in the same series direction and for respectively moving the first and second confining devices away from each other, wherein the second movement means comprise a control unit for control of the first servomotor and the second servomotor which are active on the first confining device and active on the second confining device, respectively, in a mutually adjusted manner and wherein the control unit is configured to maintain engagement of the first and second confining devices with both holders situated at the outer ends of the said series during the said movement thereof.

2. Device according to claim 1, wherein the first and second confining devices are provided on the first platform and the second platform, respectively.

3. Device according to claim 2, wherein the first and the second confining devices are provided with stops for the holders, which stops face each other.

4. Device according to claim 3, wherein the confining devices with the stops engage onto surfaces of the holders at the end of the series of holders, which surfaces face away from each other.

5. Device according to claim 4, wherein the holders are U-shaped with the upright legs transverse to the series direction and wherein the stops engage onto the upright end surfaces of the U-shaped holders at the ends of the series, which upright end surfaces face away from each other.

6. Device according to claim 3, wherein the confining devices are provided with a confining member that is movable between an inactive position and an active position, in which the confining member actively engages onto or into the holder.

7. Device according to claim 1,
wherein the second movement means on the first platform and the second platform are provided with a first drive element and a second drive element, respectively, which also forms a moving support for holders present on the first platform and the second platform, respectively, and drives the first confining device and the second confining device, respectively, and
wherein the first servomotor and the second servomotor are active on the first and second confining devices via the first and second drive elements, respectively.

8. Device according to claim 7, wherein the first drive element and the second drive element are one of a linear drive and a circulating drive element.

9. Device according to claim 1,
wherein the second movement means on the first platform and the second platform are provided with a first drive element and a second drive element, respectively, which directly drives the first confining device and the second confining device,
wherein the first platform and the second platform are provided with stationary supports for the holders, and
wherein the first servomotor and the second servomotor are active on the first and second confining devices via the first and second drive elements, respectively.

10. Device according to claim 9, wherein the first drive element and the second drive element are one of a linear drive and a circulating drive element.

11. Device according to claim 1, wherein the first and second confining devices are pushers.

12. Method for storing supplied articles in storage, using a storage device for storing the supplied articles, which storage device comprises a frame having a first series of elongated storage sections placed parallel to each other and extending between a first end and a second end of the frame, furthermore comprising a number of holders for the articles, wherein the storage sections are provided with holder supports on which a number of the holders can be supported for storage of the articles, wherein at the first end and the second end of the frame a first platform and a second platform, respectively, have been arranged, wherein the method comprises:

placing the supplied article on a holder and taking the holder with the supplied article by the first platform to a selected storage section, receiving the holder in question from the first platform on the holder supports of said storage section while discharging another holder from said same storage section to the second platform, and wherein the method further comprises:

in a first phase, after the first platform and the second platform have been brought in line with the selected storage section, pushing the holders that are present on the first platform and second platform and the selected storage section against each other into a contiguous series, and in a second phase, moving the holders that are present on the first platform and second platform and the selected storage section as a contiguous series, while keeping the series at both ends of the series confined, until the desired discharge and/or reception of a holder to or on, respectively, the selected storage section has taken place, wherein the method further comprises:

in said first phase at both ends of the series, moving a first confining device and a second confining device, respectively, towards each other and into engagement with both holders situated at the outer ends of said series of holders, while forming the contiguous series of holders, and in said second phase moving the first and second confining devices in equal sense while taking along the series of holders present in between them, wherein the second phase comprises an acceleration phase and a deceleration phase.

13. Method according to claim 12, comprising:

after the desired discharge or reception, respectively, of one or more holders has taken place, the step of interrupting the series by moving the holders then present on the first and second platform away from the storage section, and at a third phase, moving the first and second confining devices away from each other again.

14. Method according to claim 12, wherein the holders on the first platform and the second platform are supported by first and second supports, respectively, which are driven for carrying out the desired movement of the holders, the method further comprising the step of moving the first and second confining devices along with the first and second supports, the first and second supports being designed as driven endless support elements, and the first and second confining devices being driven by the first and second supports.

15. Method according to claim 14, wherein each of the first and second supports is designed as one of a driven conveyor belt, a string conveyor, and a chain conveyor.

16. Method according to claim 12, wherein the holders on the first platform and the second platform are supported by first and second supports, respectively, which are stationary in the platform, the method further comprising effecting the movement of the holders by direct driving of the confining devices and shifting the holders over the stationary supports.

17. Method according to claim 12, wherein the method further comprises the steps of, at another selected storage section, repeating the process in the opposite sense, including receiving a holder from the second platform onto the storage section while discharging a holder from the storage section onto the first platform.

18. Method according to claim 12, wherein the second phase comprises a phase of uniform speed in between the acceleration phase and the deceleration phase.

19. Method according to claim 12, starting the second phase at speed zero and ending the second phase at speed zero.

20. Method for retrieving articles from storage, using a storage device in which the articles are stored, which storage device comprises a frame having a first series of elongated storage sections placed parallel to each other and extending between a first end and a second end of the frame, furthermore comprising a number of holders for the articles, wherein the storage sections are provided with holder supports on which a number of the holders can be supported for storage of the articles, wherein at the first end and the second end of the frame a first platform and a second platform, respectively, have been arranged, wherein the method comprises:

moving the first platform and the second platform to a selected storage section which contains the holder with the article which is to be retrieved;

discharging the holder with the article which is to be retrieved from the holder supports of said selected storage section to the second platform while receiving a holder from the first platform on the holder supports of said selected storage section;

moving the first and the second platform away from the selected storage section, while the second platform supports the holder with the article which is to be retrieved;

discharging the article which is to be retrieved from the storage device;

wherein the method further comprises:

in a first phase, after the first platform and the second platform have been brought in line with the selected storage section, pushing the holders that are present on the first platform and second platform and the selected storage section against each other into a contiguous series; and in a second phase, moving the holders that are present on the first platform and second platform and the selected storage section as a contiguous series, while keeping the series at both ends of the series confined, until the desired discharge and/or reception of a holder to or on, respectively, the selected storage section has taken place;

wherein the method further comprises:

in said first phase at both ends of the series, moving a first confining device and a second confining device, respectively, towards each other and into engagement with both holders situated at the outer ends of said series of holders, while forming the contiguous series of holders; and in said second phase moving the first and second confining devices in equal sense while taking along the series of holders present in between them, wherein the second phase comprises an acceleration phase and a deceleration phase.

21. Method according to claim 20, comprising, after the desired discharge or reception, respectively, of one or more holders has taken place at the selected storage section, the step of interrupting the series by moving the holders then present on the first and second platform away from the storage section, and at a third phase, moving the first and second confining devices away from each other again.

22. Method according to claim 20, wherein the method further comprises the steps of, at another selected storage section, repeating the process in the opposite sense, including receiving a holder from the second platform onto the storage section while discharging a holder from the storage section onto the first platform.

* * * * *